United States Patent [19]
Vannan, Jr.

[11] 4,017,352
[45] Apr. 12, 1977

[54] APPARATUS USED IN THE APPLICATION OF WHITE SIDEWALL TO A TIRE

[75] Inventor: Frederick F. Vannan, Jr., Akron, Ohio

[73] Assignee: The Goodyear Tire & Rubber Company, Akron, Ohio

[22] Filed: May 26, 1976

[21] Appl. No.: 690,114

[52] U.S. Cl. .............................. 156/502; 156/583; 425/26

[51] Int. Cl.² .................... B29C 27/00; B29H 7/00

[58] Field of Search ................ 425/11, 15, 16, 26; 156/134, 412, 421, 502

[56] References Cited

UNITED STATES PATENTS

| | | | |
|---|---|---|---|
| 2,426,767 | 9/1947 | Du Pont | 425/26 |
| 2,577,570 | 12/1951 | Eisenberg | 156/502 |
| 2,668,984 | 2/1954 | Gaschi | 425/11 |
| 2,688,996 | 9/1954 | Loomis | 156/134 |
| 2,696,021 | 12/1954 | Cox et al. | 425/26 |
| 2,875,470 | 3/1959 | Goodman | 425/26 |
| 2,889,579 | 6/1959 | Hedge | 425/26 |
| 2,934,786 | 5/1960 | Du Pont | 425/26 |
| 2,942,296 | 6/1960 | Hewatt | 425/26 |
| 2,955,640 | 10/1960 | Barns | 156/502 |
| 3,433,690 | 3/1969 | Barns | 156/502 X |
| 3,690,992 | 9/1972 | Brewer | 156/412 |
| 3,850,423 | 11/1974 | Hogg et al. | 425/26 X |
| 3,944,460 | 3/1976 | Karr | 156/502 X |

Primary Examiner—J. Howard Flint, Jr.
Attorney, Agent, or Firm—F. W. Brunner; H. E. Hummer

[57] ABSTRACT

An apparatus for treating the spliced ends of a strip of white sidewall positioned on an unvulcanized tire. The unvulcanized tire is positioned such that the spliced ends of the strip rest against a resilient cushion located adjacent the inner peripheral surface of the tire. A heated pad is movable toward the cushion to compress the spliced ends of the strip together while simultaneously heating the ends to cause a crosslinking and at least a partial vulcanization of the rubber of the spliced ends to provide a highly improved splice which will not readily come apart under stress.

9 Claims, 1 Drawing Figure

U.S. Patent      April 12, 1977      4,017,352
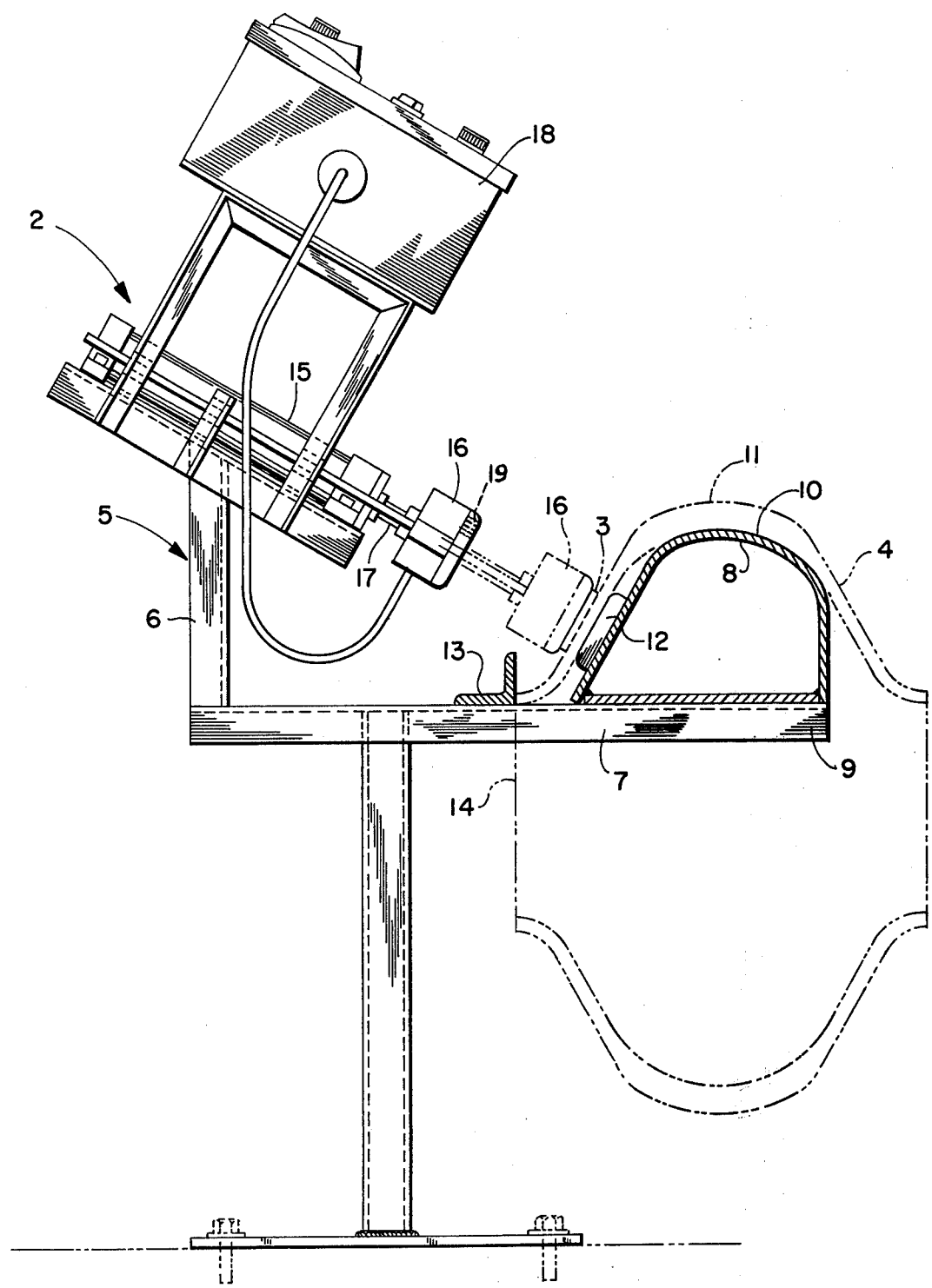

APPARATUS USED IN THE APPLICATION OF WHITE SIDEWALL TO A TIRE

BACKGROUND OF THE INVENTION

The invention is designed to improve a splice in a piece of elastomeric material, especially a strip of white sidewall after it has been applied to an unvulcanized tire. Strips of white sidewall rubber, covered by black rubber, are usually the last components to be positioned on the unvulcanized tire. The opposing ends of a strip are matingly cut on an angle along a line which is normal to the longitudinal axis of the strip. The cut ends are abutted together and hand-stitched down against the unvulcanized tire. It has been found that such splices occasionally open up or come apart when placed under the stresses encountered during molding of the tire. An opened splice creates an unsightly defect in the finished tire from an aesthetic standpoint. The invention is directed to solving this problem by providing a highly improved splice which will not come apart under the stresses normally experienced by the splice.

Briefly stated, the invention is in an apparatus for splicing together opposing angularly cut ends of a strip of elastomeric material used in the building of a tire. The apparatus comprises a resilient cushion which is positionable on one side of the splice adjacent the spliced ends of the strip. A pad is mounted in spaced relation from the cushion, and means are provided for causing relative movement between the pad and cushion to compress the spliced ends of the strip between them. Other means are supplied for heating the pad to correspondingly heat the elastomeric material of the spliced ends sufficiently to cause a physical and chemical bond between the spliced ends.

The spliced ends, so to speak, are welded together to form a unitary integral structure where the splice once was. Such a unitary structure will not tear or come apart under stress, as do conventionally made splices. Sometimes, a hot knife is used to sear the outer surface of a splice to help hold the spliced ends together, but even in such cases the splice still exists and is susceptible to coming apart under stress.

DESCRIPTION OF DRAWINGS

The drawing is a sideview of an apparatus made in accordance with the invention.

DETAILED DESCRIPTION OF THE INVENTION

The following description of the invention will be better understood by having reference to the annexed drawing which is a side view of an apparatus 2 for treating a splice made in a strip 3 of white sidewall rubber after the strip 3 has been positioned on an unvulcanized tire 4 which, in this case, is a radial tire which has been partially toroidally shaped, as shown in dotted line. The white sidewall rubber of the strip 3 is normally encapsulated in black rubber. The splice treating apparatus 2 has a rigid frame 5 which essentially comprises a vertically disposed post 6 with an outstanding arm 7 that is horizontally disposed and at right angles to the vertical post 6.

A heavy gauge, sheet metal cap 8 is secured to the free end 9 of the rigid arm 7. The sheet metal cap 8 is designed to rest against the inner crown 10 of the unvulcanized tire 4 opposite the tread 11, and support a resilient cushion 12 in fixed angular relation to the horizontal; i.e. the resilient cushion 12 will generally parallel the strip 3 of white sidewall when the unvulcanized tire 4 is mounted on the rigid arm 7 and attached sheet metal cap 8 which are designed to support the unvulcanized tire 4 in a vertical plane, whereby the center axis of the unvulcanized tire 4 is horizontal. A stop 13 is secured on the rigid support arm 7 in spaced relation from the sheet metal cap 8 and resilient cushion 12 for engaging an adjacent beaded end 14 of the unvulcanized tire 4 when the tire is properly positioned on the sheet metal cap 8. The resilient cushion is composed of any suitable elastomeric material, e.g. natural or synthetic rubber.

An appropriately designed air cylinder 15 is angularly mounted on the upstanding post 6. A pad 16 is fastened to the free end of the piston rod 17 protruding from the air cylinder 15. The air cylinder 15 is utilized to reciprocate the pad to and from the resilient cushion 12 along the axis which is generally perpendicular to the plane of the resilient cushion 12, such that the pad 16 will substantially parallel the resilient cushion 12, as it engages the spliced ends of the strip 3 of white sidewall to press the spliced ends against the resilient cushion 12. The pad 16 is rigid and composed of any suitable heat conductive material such as metal which is heated by any appropriate means; e.g. steam or, as shown in the drawing, electricity from any convenient source 18 of electrical energy. In some instances, the rigid pad 16 may be composed of a number of rigid, movable segments 19 which can be adapted to the contour of the component being spliced, or the pad itself may be shaped to matingly engage a configured component. In the latter case, an inflatable bag (not shown) could be used to allow movement of the rigid segments of the pad.

Thus, it can be appreciated that the splice treating apparatus 2 is designed to simultaneously heat and press the spliced ends of the strip 3 of white sidewall together to create both a mechanical bond and chemical linkage between the rubber material of the spliced ends. This is accomplished by heating the rubber of the spliced ends sufficiently to cause the rubber to flow and at least partially vulcanize to form an integrated structure where the splice once existed. Such a unitary structure is not susceptible to coming apart when placed under stress.

In practice, a strip 3 of white sidewall is positioned, by hand, on the unvulcanized tire 4. The splice is conventionally made by skiving, or cutting the opposing ends of the strip 3 on mating angles in directions which are perpendicular to the longitudinal axis of the strip 3. The matingly cut ends of the strip 3 are then butted together and stitched, by hand, against the unvulcanized tire 4. The unvulcanized tire 4 is subsequently positioned on the sheet metal cap 8 such that the spliced ends of the strip 3 of white sidewall are in alignment with the resilient cushion 12. A switching mechanism is actuated to electrically heat the rigid pad 16. The air cylinder 15 is then actuated to jam the heated pad 16 against the spliced ends of the strip 3 of white sidewall to heat and pressure the rubber of the spliced ends sufficiently to vulcanize the rubber, under pressure, thereby eliminating the spliced ends and forming a unitary rubber structure.

Thus, there has been provided an apparatus for producing a highly improved splice. As previously indicated, a hot knife is sometimes used to sear the outer surfaces of a splice, but no deliberate attempt is made to completely remove the cut or splice in the rubber material by the formation of a unitary or integrated structure which will not tear or come apart under stress.

I claim

1. An apparatus for treating abutted, spliced ends of a component of an unvulcanized tire, comprising:
   a. means for supporting spliced ends of an unvulcanized component in spliced, abutting engagement;
   b. a movable pad disposed in spaced relation from the support means, said pad including a number of rigid, movable segments composed of heat conductive material and means for allowing the segments to conform to the contour of the spliced ends;
   c. means for reciprocating the pad to and from the support means, whereby the spliced ends of the component are compressed between the support means and pad; and
   d. means for heating the pad to correspondingly heat the spliced ends of the components sufficiently to bond the spliced ends together.

2. The apparatus of claim 1, wherein the support means comprises a resilient cushion composed of rubber of the group of synthetic and natural rubbers.

3. The apparatus of claim 2, wherein the means for supporting the spliced ends includes means for holding the cushion in a plane angularly disposed to the horizontal.

4. The apparatus of claim 3, wherein the means for reciprocating the pad includes means for holding the pad parallel to the cushion as the pad reciprocates.

5. The apparatus of claim 3, wherein the means for supporting the spliced ends includes a curved metallic surface for engaging the inner crown of the unvulcanized tire opposite the tread, and a stop spaced from the curved surface for engaging the unvulcanized tire adjacent a bead of the tire.

6. An apparatus for treating abutted spliced ends of a strip of elastomeric material, comprising:
   a. a support for the spliced ends;
   b. a rigid pad, said pad including a number of rigid, movable segments composed of heat conductive material and means for allowing the segments to conform to the contour of the spliced ends;
   c. means for heating the pad; and
   d. means for causing relative movement between the pad and support, whereby the spliced ends of the strip of elastomeric material are compressed between the pad and support.

7. The apparatus of claim 6, wherein the means for causing relative movement between the pad and support includes means for holding the support in a fixed position, means for reciprocating the pad to and from the support, and means for holding the pad parallel to the support as the pad reciprocates.

8. The apparatus of claim 7, wherein the support is composed of rubber material.

9. The apparatus of claim 8, which includes means for heating the pad electrically.

* * * * *